(12) United States Patent
Matusik et al.

(10) Patent No.: US 11,712,837 B2
(45) Date of Patent: Aug. 1, 2023

(54) OPTICAL SCANNING FOR INDUSTRIAL METROLOGY

(71) Applicant: Inkbit, LLC, Medford, MA (US)

(72) Inventors: Wojciech Matusik, Lexington, MA (US); Aaron Weber, Arlington, MA (US); Desai Chen, Arlington, MA (US); Gregory Ellson, Cambridge, MA (US); Javier Ramos, Boston, MA (US); Davide Marini, Medford, MA (US)

(73) Assignee: Inkbit, LLC, Medford, MA (US)

( * ) Notice: Subject to any disclaimer, the term of this patent is extended or adjusted under 35 U.S.C. 154(b) by 19 days.

(21) Appl. No.: 17/307,487

(22) Filed: May 4, 2021

(65) Prior Publication Data

US 2021/0252775 A1 Aug. 19, 2021

Related U.S. Application Data (63) Continuation-in-part of application No. PCT/US2020/019014, filed on Feb. 20, 2020, and a continuation-in-part of application No. 16/671,234, filed on Nov. 1, 2019, now Pat. No. 10,994,477.

(51) Int. Cl.
*B29C 64/112* (2017.01)
*G01N 21/88* (2006.01)
(Continued)

(52) U.S. Cl.
CPC .......... *B29C 64/112* (2017.08); *B29C 64/268* (2017.08); *B29C 64/40* (2017.08);
(Continued)

(58) Field of Classification Search
CPC ...... B33Y 10/00; B29C 64/135; B29C 64/205
See application file for complete search history.

(56) References Cited

U.S. PATENT DOCUMENTS

| 5,460,758 A | 10/1995 | Langer et al. |
| 6,492,651 B2 | 12/2002 | Kerekes |

(Continued)

FOREIGN PATENT DOCUMENTS

| EP | 2186625 B1 | 12/2016 |
| EP | 3459716 A1 | 3/2019 |

(Continued)

OTHER PUBLICATIONS

Daniel Markl et al: "Automated pharmaceutical tablet coating layer evaluation of optical coherence tomography mages", Measurement Science and Technology, IOP, Bristol, GB, vol. 26, No. 3, Feb. 2, 2015 (Feb. 2, 2015), p. 35701, XP020281675, ISSN: 0957-0233, DOI: 10.1088/0957-0233/26/3/035701 [retrieved on Feb. 2, 2015].

(Continued)

*Primary Examiner* — Galen H Hauth
(74) *Attorney, Agent, or Firm* — Occhiuti & Rohlicek LLP (57) ABSTRACT

A method for additive manufacturing includes forming an object including depositing a first material including a first coloring component and a second material including a second coloring component, wherein both the first material and the second material further include a corresponding fluorescent component, scanning the object, including causing an emission of an optical signal from the object, wherein the emission of the optical signal is caused at least in part by an emission from the fluorescent components interacting with the first coloring component and the second coloring component as it passes from the fluorescent components to the surface of the object, sensing the emission of the optical signal, and determining presence of the first material and the second material based at least in part on the sensed emission of the optical signal.

19 Claims, 5 Drawing Sheets

(51) Int. Cl.
    *G02B 26/10* (2006.01)
    *B29C 64/40* (2017.01)
    *B29C 64/268* (2017.01)
    *B33Y 10/00* (2015.01)
    *B29K 105/00* (2006.01)

(52) U.S. Cl.
    CPC .......... *B33Y 10/00* (2014.12); *G01N 21/8851* (2013.01); *G02B 26/10* (2013.01); *B29K 2105/0032* (2013.01); *B29K 2995/0021* (2013.01); *B29K 2995/0026* (2013.01); *B29K 2995/0029* (2013.01); *B29K 2995/0035* (2013.01); *G01N 2021/887* (2013.01); *G01N 2021/8887* (2013.01)

(56) References Cited

U.S. PATENT DOCUMENTS

| | | |
|---|---|---|
| 8,237,788 B2 | 8/2012 | Cooper et al. |
| 9,259,931 B2 | 2/2016 | Moreau et al. |
| 9,562,759 B2 | 2/2017 | Vogler et al. |
| 9,697,604 B2 | 7/2017 | Wang et al. |
| 9,952,506 B2 | 4/2018 | Arai et al. |
| 10,011,071 B2 | 7/2018 | Batchelder |
| 10,252,466 B2 | 4/2019 | Ramos et al. |
| 10,456,984 B2 | 10/2019 | Matusik et al. |
| 10,725,446 B2 | 7/2020 | Mercelis |
| 10,926,473 B1 | 2/2021 | Matusik et al. |
| 10,994,490 B1 | 5/2021 | Matusik et al. |
| 2002/0104973 A1 | 8/2002 | Kerekes |
| 2004/0085416 A1 | 5/2004 | Kent |
| 2004/0114002 A1 | 6/2004 | Kosugi et al. |
| 2004/0173946 A1 | 9/2004 | Pfeifer et al. |
| 2006/0007254 A1 | 1/2006 | Tanno et al. |
| 2007/0106172 A1 | 5/2007 | Abreu |
| 2007/0241482 A1 | 10/2007 | Giller et al. |
| 2008/0124475 A1 | 5/2008 | Kritchman |
| 2009/0073407 A1 | 3/2009 | Okita |
| 2009/0105605 A1 | 4/2009 | Abreu |
| 2009/0220895 A1 | 9/2009 | Garza et al. |
| 2009/0279089 A1 | 11/2009 | Wang |
| 2009/0279098 A1 | 11/2009 | Ohbayashi et al. |
| 2010/0140550 A1 | 6/2010 | Keller et al. |
| 2010/0158332 A1 | 6/2010 | Rico et al. |
| 2012/0275148 A1 | 11/2012 | Yeh et al. |
| 2013/0182260 A1 | 7/2013 | Bonnema et al. |
| 2013/0328227 A1 | 12/2013 | Mckinnon et al. |
| 2014/0249663 A1 | 9/2014 | Voillaume |
| 2014/0300676 A1 | 10/2014 | Miller et al. |
| 2014/0328963 A1 | 11/2014 | Mark et al. |
| 2015/0061178 A1 | 3/2015 | Siniscalchi et al. |
| 2015/0101134 A1 | 4/2015 | Manz et al. |
| 2015/0124019 A1 | 5/2015 | Cruz-Uribe et al. |
| 2015/0140295 A1* | 5/2015 | Okamoto .............. B33Y 10/00 428/206 |
| 2015/0352792 A1 | 12/2015 | Kanada |
| 2016/0018404 A1 | 1/2016 | Iyer et al. |
| 2016/0023403 A1 | 1/2016 | Ramos et al. |
| 2016/0101568 A1 | 4/2016 | Mizes et al. |
| 2016/0157751 A1 | 6/2016 | Mahfouz |
| 2016/0167301 A1 | 6/2016 | Cole et al. |
| 2016/0185044 A1 | 6/2016 | Leonard et al. |
| 2016/0209319 A1 | 7/2016 | Adalsteinsson et al. |
| 2016/0249836 A1 | 9/2016 | Gulati et al. |
| 2016/0320771 A1 | 11/2016 | Huang |
| 2016/0347005 A1 | 12/2016 | Miller |
| 2017/0021455 A1 | 1/2017 | Dallarosa et al. |
| 2017/0050374 A1 | 2/2017 | Minardi et al. |
| 2017/0078524 A1 | 3/2017 | Tajima et al. |
| 2017/0087766 A1 | 3/2017 | Chung et al. |
| 2017/0106604 A1 | 4/2017 | Dikovsky et al. |
| 2017/0120337 A1 | 5/2017 | Kanko et al. |
| 2017/0125165 A1 | 5/2017 | Prest |
| 2017/0132355 A1* | 5/2017 | Vasquez ................ G06F 30/15 |
| 2017/0143494 A1 | 5/2017 | Mahfouz |
| 2017/0217103 A1 | 8/2017 | Babaei et al. |
| 2017/0235293 A1 | 8/2017 | Shapiro et al. |
| 2017/0355147 A1 | 12/2017 | Buller et al. |
| 2017/0372480 A1 | 12/2017 | Anand et al. |
| 2018/0017501 A1 | 1/2018 | Trenholm et al. |
| 2018/0036964 A1 | 2/2018 | DehghanNiri et al. |
| 2018/0056288 A1 | 3/2018 | Abate et al. |
| 2018/0056582 A1 | 3/2018 | Matusik et al. |
| 2018/0071984 A1 | 3/2018 | Lee et al. |
| 2018/0095450 A1 | 4/2018 | Lappas et al. |
| 2018/0099333 A1 | 4/2018 | DehghanNiri et al. |
| 2018/0143147 A1 | 5/2018 | Milner et al. |
| 2018/0154580 A1 | 6/2018 | Mark |
| 2018/0169953 A1 | 6/2018 | Matusik et al. |
| 2018/0194066 A1 | 7/2018 | Ramos et al. |
| 2018/0273657 A1 | 9/2018 | Wang et al. |
| 2018/0275636 A1 | 9/2018 | Zhao et al. |
| 2018/0281067 A1 | 10/2018 | Small et al. |
| 2018/0297113 A1 | 10/2018 | Preston et al. |
| 2018/0304540 A1 | 10/2018 | Tobia et al. |
| 2018/0304549 A1 | 10/2018 | Safai et al. |
| 2018/0311893 A1 | 11/2018 | Choi et al. |
| 2018/0320006 A1 | 11/2018 | Lee et al. |
| 2018/0341248 A1 | 11/2018 | Mehr et al. |
| 2018/0348492 A1 | 12/2018 | Pavlov et al. |
| 2018/0361668 A1 | 12/2018 | Kim et al. |
| 2019/0056717 A1 | 2/2019 | Kothari et al. |
| 2019/0077921 A1 | 3/2019 | Eckel |
| 2019/0118300 A1 | 4/2019 | Penny et al. |
| 2019/0230248 A1 | 7/2019 | Mizes et al. |
| 2019/0270254 A1 | 9/2019 | Mark et al. |
| 2019/0271966 A1 | 9/2019 | Coffman et al. |
| 2019/0283329 A1 | 9/2019 | Lensgraf et al. |
| 2019/0322031 A1 | 10/2019 | Kritchman |
| 2019/0329322 A1 | 10/2019 | Preston et al. |
| 2019/0346830 A1 | 11/2019 | de Souza Borges Ferreira et al. |
| 2019/0353767 A1 | 11/2019 | Eberspach et al. |
| 2019/0389123 A1 | 12/2019 | Parker et al. |
| 2020/0004225 A1 | 1/2020 | Buller et al. |
| 2020/0122388 A1 | 4/2020 | Van Esbroeck et al. |
| 2020/0143006 A1 | 5/2020 | Matusik et al. |
| 2020/0147888 A1 | 5/2020 | Ramos et al. |
| 2020/0215761 A1 | 7/2020 | Chen et al. |
| 2020/0223143 A1 | 7/2020 | Gurdiel Gonzalez et al. |
| 2020/0353684 A1* | 11/2020 | Dudley ................ B29C 64/124 |
| 2020/0399411 A1 | 12/2020 | Shpayzer et al. |
| 2021/0362225 A1 | 11/2021 | Yun et al. |

FOREIGN PATENT DOCUMENTS

| | | |
|---|---|---|
| EP | 3527352 A1 | 8/2019 |
| JP | 2014098555 A | 5/2014 |
| JP | 6220476 B1 | 10/2017 |
| JP | 2018103488 A | 7/2018 |
| KR | 101567281 B1 | 11/2015 |
| KR | 20180067961 A | 6/2018 |
| WO | 98/45141 A2 | 10/1998 |
| WO | 2003/026876 A2 | 4/2003 |
| WO | 2015174867 A1 | 11/2015 |
| WO | 2017066077 A1 | 4/2017 |
| WO | 2018080397 A1 | 5/2018 |
| WO | 2018197376 A1 | 11/2018 |
| WO | 2018209438 A1 | 11/2018 |
| WO | 2019070644 A2 | 4/2019 |
| WO | 2019125970 A1 | 6/2019 |
| WO | 2020123479 A1 | 6/2020 |
| WO | 2020/146490 A1 | 7/2020 |
| WO | 2020145982 A1 | 7/2020 |
| WO | 2020231962 A1 | 11/2020 |
| WO | 2020264314 A1 | 12/2020 |

OTHER PUBLICATIONS

Daniel Markl et al: "In-line quality control of moving objects by means of spectral-domain OCT", Optics and Lasers in Engineering, vol. 59, Aug. 1, 2014 (Aug. 1, 2014), pp. 1-10, XP055671920, Amsterdam, NL ISSN: 0143-8166, DOI: 10.1016/j.optlaseng.2014.02.008.

(56) References Cited

OTHER PUBLICATIONS

Yu C, Jiang J. A Perspective on Using Machine Learning in 3D Bioprinting. Int J Bioprint. Jan. 24, 2020;6(1):253. doi 10.18063/ijb.v6i1.253.

Goh, G.D., Sing, S.L. & Yeong, W.Y. A review on machine learning in 3D printing: applications, potential, and challenges. Artif Intell Rev 54, 63-94 (2021). https://doi.org/10.1007/s10462-020-09876-9. Optimal shape morphing control of 4D printed shape memory polymer based on reinforcement learning Robotics and Computer-Integrated Manufacturing (IF5.666), Pub Date : Jul. 17, 2021, DOI: 10.1016/j.rcim.2021.102209.

Zhao, Xiaozhou, Julia A. Bennell, Tolga Bekta?, and Kath Dowsland. "A comparative review of 3D container loading algorithms." International Transactions in Operational Research 23, No. 1-2 (2016): 287-320.

Alarousu, Erkki, Ahmed AlSaggaf, and Ghassan E. Jabbour. "Online monitoring of printed electronics by speclial-domain optical coherence tomography." Scientific reports 3 (2013): 1562.

Daniel Markl et al: "Automated pharmaceutical tablet coating layer evaluation of optical coherence tomography images", Measurement Science and Technology, IOP, Bristol, GB, vol. 26, No. 3, Feb. 2, 2015 (Feb. 2, 2015), p. 35701, XP020281675.

Blanken, Lennart, Robin de Rozario, Jurgen van Zundert, Sjirk Koekebakker, Maarten Steinbuch, and Tom Oomen. "Advanced feedforward and learning control for mechatronic systems." In Proc. 3rd DSPE Conf. Prec. Meeh, pp. 79-86. 2016.

Blanken, Lennart. "Learning and repetitive control for complex systems: with application to large format printers." (2019).

DebRoy, T.; Wei, H.L.; Zuback, U.S.; Muhkerjee, T.; Elmer, J.W.; Milewski, J.O.; Beese, A.M.; Wilson-Heid, A.; Ded, A.; and Zhang, W., "Additive manufacturing of metallic components—Process, structure and properties", Jul. 3, 2017, Progress in Materials Science 92 (2018) 112-224. (Year: 2017).

Fischer, Björn, Christian Wolf, and Thomas Härtling. "Large field optical tomography system." In Smart Sensor Phenomena, Technology, Networks, and Systems Integration 2013, vol. 8693, p. 86930P. International Society for Optics and Photonics, 2013.

Huo, Tiancheng, Chengming Wang, Xiao Zhang, Tianyuan Chen, Wenchao Liao, Wenxin Zhang, Shengnan Ai, Jui-Cheng Hsieh, and Ping Xue. "Ultrahigh-speed optical coherence tomography utilizing all-optical 40 MHz swept-source." Journal of biomedical optics 20, No. 3 (2015): 030503.

Daniel Markl et al.: "In-line quality control of moving objects by means of spectral-domain OCT", Optics and Lasers in Engineering, vol. 59, Aug. 1, 2014 (Aug. 1, 2014), pp. 1-10, XP055671920, Amsterdam, NL.

Klein, Thomas, and Robert Huber "High-speed OCT light sources and systems " Biomedical optics express 8, No. 2 (2017): 828-859.

Kulik, Eduard A., and Patrick Calahan. "Laser profilometry of polymeric materials." Cells and Materials 7, No. 2 (1997): 3.

Sitthi-Amorn, Pitchaya, Javier E. Ramos, Yuwang Wangy, Joyce Kwan, Justin Lan, Wenshou Wang, and Wojciech Matusik. "MultiFab: a machine vision assisted platform for multi-material 3D printing." ACM Transactions on Graphics (TOG) 34, No. 4 (2015): 129.

Moon, Sucbei, and Dug Young Kim. "Ultra-high-speed optical coherence tomography with a stretched pulse supercontinuum source." Optics Express 14, No. 24 (2006): 11575-11584.

Oomen, Tom. "Advanced motion control for next-generation precision mechatronics: Challenges for control, dentification, and learning." In IEEJ International Workshop on Sensing, Actuation, Motion Control, and Optimization (SAMCON), pp. 1-12. 2017.

Park, Yongwoo, Tae-Jung Ahn, Jean-Claude Kieffer, and José Azaña. "Optical frequency domain reflectometry based an real-time Fourier transformation." Optics express 15, No. 8 (2007): 4597-4616.

Qi, X.; Chen, G.; Li, Y.; Cheng, X.; and Li, C., "Applying Neural-Network Based Machine Learning to Addirive Manufacturing: Current Applications, Challenges, and Future Perspectives", Jul. 29, 2018, Engineering 5 (2019) 721-729. (Year: 2019).

Wieser, Wolfgang, Benjamin R. Biedermann, Thomas Klein, Christoph M. Eigenwillig, and Robert Huber. "Multi-megahertz OCT: High quality 3D imaging at 20 million A-scans and 4.5 GVoxels per second." Optics express 18, No. 14 (2010): 14685-14704.

Xu, Jingjiang, Xiaoming Wei, Luoqin Yu, Chi Zhang, Jianbing Xu, K. K. Y. Wong, and Kevin K. Tsia. "Performance of megahertz amplified optical time-stretch optical coherence tomography (AOT-OCT)." Optics express 22, No. 19 (2014): 22498-22512.

Zhou, Chao, Aneesh Alex, Janarthanan Rasakanthan, and Yutao Ma. "Space-division multiplexing optical coherence tomography." Optics express 21, No. 16 (2013): 19219-19227.

Piovarci, Michal, Michael Foshey, Timothy Erps, Jie Xu, Vahid Babaei, Piotr Didyk, Wojciech Matusik, Szymon Rusinkiewicz, and Bernd Bickel. "Closed-Loop Control of Additive Manufacturing via Reinforcement Learning." (2021).

\* cited by examiner

OPTICAL SCANNING FOR INDUSTRIAL METROLOGY

CROSS-REFERENCES TO RELATED APPLICATIONS

This application is a continuation-in-part of U.S. application Ser. No. 16/671,234 filed Nov. 1, 2019 and the entire contents of which are incorporated herein by reference. This application is also a continuation-in-part of International Application No. PCT/US2020/19014, filed Feb. 20, 2020, the entire contents of which are incorporated herein by reference.

BACKGROUND OF THE INVENTION

This application relates to optical scanning for industrial metrology, and more particularly to material properties to improve optical scanning during three-dimensional printing.

Transparent substrates are difficult to reliably scan using laser profilometry due to the laser beam being absorbed in or passing through the sample. This reduces the amount of light reflected or scattered by the sample, thereby reducing the signal available to the sensor element. If insufficient light from the surface reaches the sensor, the scanner may not produce an accurate depth map of the surface. This is particularly common in polymeric materials, many of which are fully or partially transparent or translucent to the laser wavelengths used in commercial profilometer systems.

Additive manufacturing refers to a set of methods that allows objects to be fabricated via selective addition of material. A typical additive manufacturing process works by slicing a digital model (for example, represented using an STL file) into a series of layers. Then the layers are sent to a fabrication apparatus that deposits the layers one by one from the bottom to the top. Additive manufacturing is rapidly gaining popularity in a variety of markets including automotive, aerospace, medical devices, pharmaceuticals, and industrial tooling.

The growth of additive manufacturing processes has led to various iterations of such processes being commercialized, including extrusion processes, such as fused deposition Modeling® (FDM®), light polymerization processes, such as stereolithography (SLA) and multijet/polyjet, powder bed fusion processes, such as selective laser sintering (SLS) or binder jetting, and lamination processes, such as laminated object manufacturing (LOM). Nevertheless, despite this growth and rapid progress, additive manufacturing has limitations, such as the materials that can be used in conjunction with such processes. There are limited types of materials, and the performance of the materials limit the efficiency and quality that results.

Inkjet 3D printing is a method of additive manufacturing where printheads deposit droplets of liquid printable resins. Printheads are typically mounted on a gantry system to allow deposition of printable resins in different locations of the build volume. The build platform may also move with respect to the printheads, which may be stationary. The liquid printable resin is solidified using UV or visible-light radiation.

Multiple printheads can be used in one system in order to build objects with multiple base materials. For example, materials that have different optical, mechanical, thermal, electromagnetic properties can be used. These materials can be combined to achieve composite materials with a wide range of material properties.

The UV curing unit is typically one of the subsystems used within an inkjet additive manufacturing apparatus. UV radiation provides the means of solidifying printable resins via photo-initiation of the polymerization reaction. UV radiation can be supplied by a variety of different mechanisms such as arrays of LEDs and Mercury or Xenon arc lamps. UV curing is typically applied after each printed layer or after depositing each material within a layer. The UV curing unit can be fixed with respect to the printer or it can move independently with respect to the object.

Alternatively, printable resin solidification can be achieved by changes in thermal conditions. For example, a liquid material solidifies as its temperature is lowered. A variety of different printable resins can be used in this category, such as waxes. Both UV-phase change and thermal-phase change printable resins can be combined to manufacture an object.

3D printed objects when manufactured using an inkjet process may need structural support. For example, most objects with overhangs need support structures. Typically, additional print data is generated for these support structures. In inkjet additive manufacturing, typically a separate printable resin is designated as a support material. This printable resin is deposited also using printheads and solidified. It is desirable for the support material to be easily removed after the print is completed. There are many potential support materials including UV-curable materials that are soluble in water or other solvents or wax based materials that can be removed by melting.

After the printing process is completed, parts are typically post-processed. For example, support material may need to be removed. The parts might also need to be post-processed to improve their mechanical or thermal properties. This may include thermal treatment and/or additional UV exposure.

Printable resins suitable for inkjet printing need to conform to certain specifications. The key requirements include: 1) viscosity typically needs to be within 3-15 cps at the operating conditions; 2) surface tension typically should be between 20-45 mN/m; 3) thermal stability—the printable resin should not solidify within the printhead, printable resin container, or feeding system; 4) formulation stability—different components of the printable resin should not separate for a reasonably long time. Printable resins are typically optimized in order to meet the specifications for printing.

Furthermore, the waveform for driving the printheads must be optimized and adapted for each printable resin. Moreover, many different parameters of the printing process need to be adapted for individual printable resins, such as printhead and printable resin pre-heating.

In many cases printable resins may include additives. These additives include colorants in the form of dyes or pigments or the mixture of pigments and dyes that are dispersed or dissolved in the printable resin. Surfactants may also be used to adjust the surface tension of the printable resin for improved jetting or printing performance. In addition, other types of particles or additives may be used in order to enhance the mechanical, thermal or optical characteristics of the cured resin.

Laser profilometry is a testing method used to scan and map the surface of an object. In this method, a laser is rastered across the surface of the object (see, e.g., Kulik, Eduard A., and Patrick Calahan. "Laser profilometry of polymeric materials." Cells and Materials 7, no. 2 (1997): 3). The surface reflects the laser signal, which is detected by a sensor. The surface location can then be calculated using the known position and orientation of the laser source and sensor. This can be a highly precise and accurate measurement method, capable of producing surface maps with sub-micron detail.

Typical methods of improving signal quality in polymeric samples for laser profilometry are to coat the sample surface with a reflective substrate such as gold or to apply high degrees of filtering to the signal data. Coated substrates produce high quality signals, but this method is not feasible for cases where thousands of scans can be performed while a part is 3D printed. Signal processing can improve the scan quality, but the corrections are often material-specific and are difficult to apply to multi-material substrates.

SUMMARY OF THE INVENTION

In a general aspect, a method for additive manufacturing includes forming an object including depositing a first material including a first coloring component and a second material including a second coloring component, wherein both the first material and the second material further include a corresponding fluorescent component, scanning the object, including causing an emission of an optical signal from the object, wherein the emission of the optical signal is caused at least in part by an emission from the fluorescent components interacting with the first coloring component and the second coloring component as it passes from the fluorescent components to the surface of the object, sensing the emission of the optical signal, and determining presence of the first material and the second material based at least in part on the sensed emission of the optical signal.

Aspects may include one or more of the following features. The interaction of the emission from the fluorescent components with the first coloring component and the second coloring component may include at least some of the emission reflecting off the coloring components. The first material and the second material may include the same fluorescent component. The fluorescent component may emit light with a spectrum including a first wavelength corresponding to a first color of the first coloring component and a second wavelength corresponding to a second color of the second coloring component. The corresponding fluorescent component of the first material may emit light with a wavelength corresponding to a first color of the first coloring component and the corresponding fluorescent component of the second material emits light with a wavelength corresponding to a second color of the second coloring component. The first coloring component and the second coloring component may be dyes or pigments.

The first coloring component and the second coloring component are dyes. The first coloring component and the second coloring component are pigments. The method may include identifying a region of transition from the first material to the second material based at least in part on the determined presence of the first material and the second material. The method may include controlling further depositing of the material on the object according to the identified region of transition. Determining the presence of the first material and the second material may include distinguishing the materials according to spectral characteristics of the optical signal emitted from the object. The method may include controlling further depositing of the material on the object according to the determined presence of the first material and the second material.

Causing the emission of the optical signal from the object may include illuminating the object with electromagnetic radiation. The electromagnetic radiation may include radiation in one or more of an ultraviolet spectrum, a visible spectrum, and an infrared spectrum. The first material and the second material may be substantially transparent. The first material and the second material may be translucent. Sensing the emission of the optical signal may include sensing the emission using a camera. The first material may include a build material and the second material may include a support material. The build material may include an ultra-violet or visible light curable resin and the support material may include a wax. Scanning the object may include using a laser profilometry technique.

Other features and advantages of the invention are apparent from the following description, and from the claims.

DETAILED DESCRIPTION

Applications of scanning improvements described below include three-dimensional additive fabrication in an optical scanning feedback approach in which during fabrication, the achieved properties of a partially fabricated object are scanned and information gained from that scanning is used to modify further addition of material so that the object matches the desired characteristics, for instance in dimension or composition. The scanning can be used in various physical arrangements, including in printing arrangements described in U.S. Pat. No. 10,252,466, titled "SYSTEMS AND METHODS OF MACHINE VISION ASSISTED ADDITIVE FABRICATION," and U.S. Pat. Pub. US2018/0169953A1, titled "ADAPTIVE MATERIAL DEPOSITION FOR ADDITIVE MANUFACTURING," which are incorporated herein by reference. Although certain examples described in these documents make use of Optical Coherence Tomography (OCT) for scanning the surface of objects under manufacture, improvements described below are not necessarily directed to techniques requiring coherent reflection from objects. For example, the OCT-based scanning may be replaced with techniques that rely on detection of the point or points at which a scanning signal impinges on an object being manufactured to determine the surface shape of the object. Such techniques rely on an illuminated point emitting light, for example, due to reflection, scattering, photoluminescence, or fluorescence. A number of different types of scanning techniques may make use of such emission, including laser profilometry (e.g., using confocal or geometric approaches), or structured light scanning (e.g., projection methods using incoherent light). In general, in some such techniques, the object is illuminated or otherwise excited with electromagnetic radiation (e.g., light or radio frequency radiation) from one position, and the emissions are detected or imaged from another location, and the geometric relationship of the positions is used to compute the coordinates of the point at which the object is illuminated and therefore the point from which the emission originates. The description below may focus on laser profilometry, however it should be understood that the improvements are applicable more broadly to other scanning approaches.

In a first application, a laser profilometry approach is used to determine the depth (i.e., the amount of material deposited) during the manufacturing of an object by sensing the locations of points on the surface of the object. In this application, a base fabrication material (a "build material component") is modified before use by incorporating an additive (an "optical enhancement component") into the material that changes the properties of the optical emission during fabrication. For example, the additive may increase the scattering of light from the material and/or cause fluorescence when excited. The additive may be incorporated at the time of printing (generally as described below), or may be incorporated much earlier, for example at the time that the fabrication material is prepared and stored for later use in fabrication.

Figure 1:
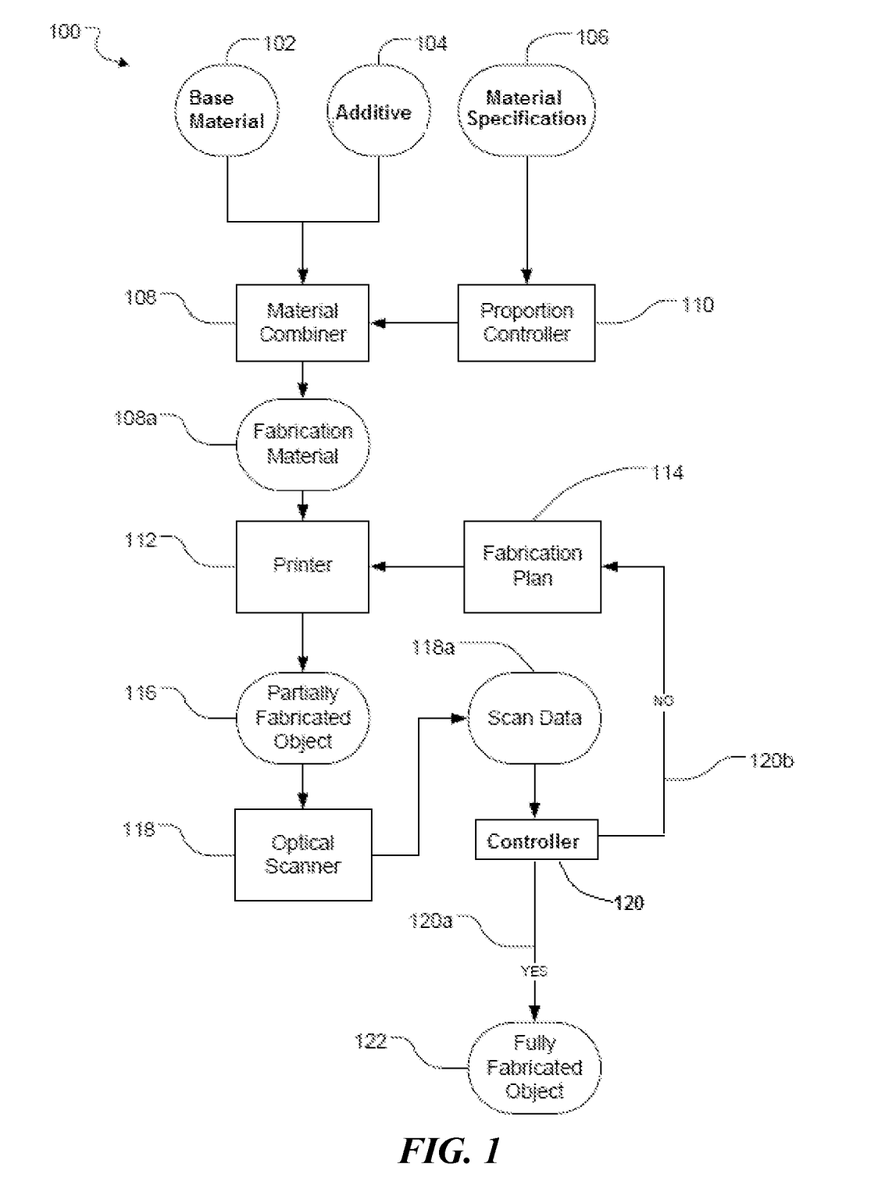
FIG. 1 shows an apparatus that uses a material additive in an additive-manufacturing process.

Referring to FIG. 1, in an additive manufacturing process 100, a material combiner 108 uses a material specification 106 as a basis for combining a base material 102 and an additive 104 to produce a fabrication material 108a. One example of an additive manufacturing-process 100 is a three-dimensional printing process.

Using the material specification 106, a proportion controller 110 controls the material combiner 108. As a result of such controller, the material combiner 108 causes the fabrication material 108a to have the correct relative proportions of the additive 104 and the base material 102.

The proportion controller 110 operates to control both the spatial distribution of additives and the kinds of additives that will ultimately be present in the fabrication material 108a.

There are two options for spatial distribution of additive 104 in the fabrication material 108a: a homogenous distribution and an inhomogeneous distribution. An inhomogeneous distribution can be achieved by causing the proportion controller 110 to vary the proportion of additive 104 during the printing process. Conversely, a homogeneous distribution can be achieved by maintaining the same proportion of additive 104 throughout the printing process.

In addition, the proportion controller 110 provides the option to have two or more different kinds of additives. The spatial distribution of each such additive 104 can be controlled independently of other additives 104.

In many cases, the proportion of additive 104 is low. For example, in some embodiments, the proportion of additive 104 in the fabrication material 108a is under 1%. The resulting fabrication material 108a, which is a combination of the base material 102 and the additive 104, is then provided to a printer 112.

Throughout this specification, reference is made to certain materials or substances. Consistent with the ordinary use of these terms, such references are not intended to mean that the material or substance consists of a single chemical species. Neither a material nor a substance is an "element." Nor is there a requirement that one and only one kind of molecule exist in a material or substance.

Thus, the term "additive" may refer to one or more species. Similarly, "base material" may refer to two or more species. And of course, the fabrication material 108a in FIG. 1 is, by definition, made of at least two other materials, namely the base material 102 and the additive 104. Similarly, a particular material may have constituents that are themselves complexes of different molecular species.

A fabrication plan 114 specifies the shape of the fully-fabricated object 122. Based on this fabrication plan 114 and on feedback from a scanner 118, a process controller 120 causes the printer 112 to transform the fabrication material 108a into a fully-fabricated object 122.

The printer 112 begins the foregoing transformation by depositing fabrication material 108a onto a "build surface." This initial deposition forms the first layer of a partially-fabricated object 116.

The printer 112 then deposits a second layer on this first layer. It does so based at least in part on instructions from the fabrication plan 114. This begins an iterative process that continues, layer by layer, until the process controller 120 determines that the partially-fabricated object 116 has become a fully-fabricated object 122.

Various irregularities inevitably arise during the additive manufacturing process 100. Such irregularities arise from a multitude of sources. For example, a temperature rise may expand the nozzle slightly, thus altering the rate at which fabrication material 108a leaves it. Turbulence resulting from the impact of resin on the object 116 may exert forces that disrupt the stream of resin. As a result of aging, the power output of an ultraviolet source may decrease, thus lengthening curing time. These and other events are, to a great extent, unpredictable.

Because of the foregoing irregularities, it is therefore useful to provide feedback control of the printer 112 in such a way as to compensate for these irregularities.

To make such control possible, it is necessary to identify the existence of such irregularities. It is for this purpose that the scanner 118 collects scan data 118a. This scan data 118a results from interaction between the object being manufactured and some source of electromagnetic radiation.

The process controller 120 receives the scan data 118a and asserts one of a first output 120a and a second output 120b.

Asserting the first output 120a causes the printer 112 to recognize that manufacture is complete; a fully-fabricated object 122 now exists.

Asserting the second output 120b causes the printer 112 to continue printing. However, in doing so, the process controller 120 adjusts the fabrication plan 114 based on information about the state of the partially-fabricated object 116. The process controller 120 knows about this state because it obtained scan data 118a from the scanner 118.

The process controller 120 uses one or more different kinds of information to control the overall additive manufacturing process 100. Examples include information indicative of whether the geometry of the partially-fabricated object 116 continues to be in accord with a specification in the fabrication plan 114 and if not, the nature of the deviation from that specification. In some examples, this includes obtaining data indicative of surface geometry. In other examples, this includes obtaining data indicative of depth. And in yet other embodiments, this includes obtaining data indicative of material properties of the fabrication material 108a.

Much of the information relied upon by the process controller 120 arises from interaction of electromagnetic radiation with the fabrication material 108a. The additive 104 promotes the availability of such information. It does so by enhancing the extent to which such interaction occurs. The type of interaction desired governs the choice of additive 104.

Because many base materials 102 are translucent, it is possible to observe the effects of interactions (both the interactions between the translucent base material and the electromagnetic radiation and the interactions between the additive 104 and the electromagnetic radiation) throughout the base material 102. Such interactions provide information about the three-dimensional configuration of the partially-fabricated object 116. This information also provides a way to create volumetric maps of the partially-fabricated object 116. Such volumetric maps can be made using techniques such as optical tomography. By controlling spatial distribution of the additive 104, it also becomes possible to extract additional information concerning the partially-fabricated object 116 as it is being made.

In some embodiments, the process controller 120 relies on information that results from having an additive 104 that absorbs and then re-emits energy present in an incident electromagnetic wave. These interactions fall into two broad types: scattering and fluorescence. The distinction arises from the relationship between the emitted wavelength and the incident wavelength.

In scattering interactions, an incident wave results in a scattered wave having the same wavelength as the incident wave. In such cases, it is possible to enhance the ability to detect the scattered wave by having an additive 104 that provides scattering centers distributed in the fabrication material 108a.

In fluorescence, an incident wave causes emission of radiation at a different wavelength. For example, a substance may absorb ultraviolet radiation and re-emit part of that energy as visible light. In such cases, the additive 104 includes fluorophores that promote such fluorescence.

In other cases, the interaction is one that results in luminescence, and in particular, chemiluminescence. This occurs when a chemical reaction causes emission of light. In such cases, the additive 104 is one that promotes or engages in a light-emitting reaction when exposed to incident radiation.

Correct selection of additive 104 enables the process controller 120 to acquire information indicative of physical or chemical properties. Among these are embodiments in which the process controller 120 obtains information indicative of extent of polymerization.

One way to achieve this is to use an additive 104 having a polymerization-sensitive constituent, and in particular, one that manifests such sensitivity by changing an optical property thereof. As a result, there will be an observable effect on the fabrication material's interaction with light as it polymerizes. This provides the process controller 120 with a basis for determining whether the fabrication material 108a has cured sufficiently or whether additional exposure to curing radiation is required.

An example of an additive 104 that responds to polymerization is a fluorescent dye that fluoresces in response to the presence of reactive oxygen species, unreacted monomers, or in the presence of certain molecules.

In some cases, the process of curing the fabrication material 108a introduces unwanted byproducts. To accommodate these cases, it is useful to have the process controller 120 adjust the manufacturing process 100 to minimize formation of such byproducts.

In certain other embodiments, the additive 104 is one whose ability to interact with radiation changes with time.

A particularly useful additive 104 is one that degrades at a known rate in response to exposure to curing radiation. When such an additive 104 is used, it is possible to infer that any interaction from this additive 104 occurred at the most recently deposited layer of fabrication material 108a. This provides a basis for extracting a depth map for that layer. In other embodiments, the process controller 120 carries out optical coherence tomography to produce three-dimensional depth data for the object rather than just a surface map of the object's surface.

As shown in FIG. 1, the manufacturing process 100 relies on a closed-loop feedback control system in which scan data 118a provided at the second output 120b provides a basis for controlling the printer 112 to compensate for manufacturing variability.

The inclusion of a suitable additive 104 in the fabrication material 108a enhances the performance of the optical scanner 118 and promotes the scan data's ability to accurately represent the partially fabricated object 116.

The additive manufacturing procedure 100 described in connection with FIG. 1 is essentially a three-dimensional photopolymer inkjet printing process. However, the principles described herein are applicable to other additive manufacturing process 100. Examples include selective laser sintering, fused deposition modeling, laminated object manufacturing, and stereolithography.

In generally, the principles described herein are useful for any manufacturing process in which material is added, subtracted, or otherwise transformed. Examples include coating an existing surface, evaporation methods, subtractive processes in which material is being removed, such as a milling process, and in particular, a milling process carried out through computer numerical control. In addition to being separately applicable to additive and subtractive processes, the principles described herein are applicable to processes that combine both additive and subtractive manufacturing techniques.

As used herein, the term "principles" refers to machines and methods described herein as well as machines and methods that are based on or otherwise derivable from the teachings of this specification.

The base material 102 is either a build material or a support material. In some cases, the base material 102 is a mixture or composite of two or more materials.

A base material 102 can be liquid or solid. A particularly useful type of base material 102 is one that starts as a liquid and then solidifies in response to energy transfer. In some cases, energy transfer occurs when energy leaves the base material. In others energy transfer occurs when energy enters the base material.

A particularly useful medium of energy transfer is via electromagnetic radiation.

Energy transfer into the material arises when electromagnetic radiation is incident on the material. Examples of such materials are those that solidify in response to ultraviolet radiation or infrared radiation. The energy transfer can also occur as a result of radiation by the material.

Energy transfer out of a material commonly arises when a material radiates electromagnetic waves. Examples are those materials that solidify as they cool. The energy loss associated with cooling manifests as infrared radiation. These include waxes and plastics with a melting temperature that is low relative to ambient temperature.

Examples of suitable base materials 102 include photopolymers, and in particular, resins that cure, or undergo a phase change, in response to exposure to ultraviolet. Examples of such resins include acrylates, thiol-enes, silicones, epoxies, and vinyl esters.

Other suitable base materials 102 are thermosets. Examples of suitable thermosets include rubbers, cyanate esters, furans, polyimides, polyurethanes, polyurea/polyurethane hybrids, a composite thermosetting plastic, such as DUROPLAT® or BAKELITE®, polyoxybenzylmethylenglycolanhydride, and melamine.

Also among the suitable base materials 102 are thermoplastics. Examples of suitable thermoplastics include acrylic, acrylonitrile butadiene styrene, nylon, polylactide, polybenzimidazole, polyester, polycarbonate, polyether sulfone, polyoxymethylene, polyether ether ketone, polyetherimide, polyethylene, polyphenylene sulfide, polypropylene, polystyrene, polyvinyl chloride, polyvinylidene fluoride, and polytetrafluoroethylene.

Other examples of suitable base materials 102 include phase-change materials.

In some embodiments, the base material 102 includes a reinforcement, such as one or more kinds of filler. Examples of fillers are those made of metal and those made of ceramic.

The form of a filler varies across different manufacturing methods. In fused deposition, the solid material is formed as an extrusion filament. In both selective laser sintering and three-dimensional printing, a typical filler is a powder or a coated powder. In laminated object manufacture, a typical filler takes the form of a sheet. And in numerically-controlled milling, the filler takes the form of material blocks.

As noted above, the additive 104 promotes interaction between an incident wave and the fabrication material 108a so as to enhance the scanner's ability to provide a useful measurement signal for a machine vision system. The properties of the additive 104 vary with application.

In many cases it is useful for the additive 104 to avoid absorbing significant energy in the visible range. This permits the fully-fabricated object 122 to be clear. In other cases, it is useful to have an additive 104 that interacts with radiation from other parts of the electromagnetic spectrum. Of particular usefulness is an additive 104 that scatter in a range adjacent to the visible range, such as the ultraviolet range and the infrared range.

A suitable additive 104 is a small molecule, such as a fluorescent dye or fluorophore. Examples of such dyes include fluorescein and coumarin. Other examples are those commercialized by THERMOFISCHER SCIENTIFIC® and described in a selection guide as it existed at https://www.thermofisher.com/us/en/home/life-science/cell-analysis/fluorophores.html as of the filing date of this application. These include Texas Red, Pacific Blue, and the Alexa Fluor series of dyes.

Another suitable additive 104 is a fluorescent or photoluminescent polymer, such as Poly(9-anthracenylmethyl acrylate) and Poly(fluorescein 0-acrylate), as well as many other fluorescent polymers as described extensively in the Millipore-Sigma catalog as it existed at the following link as of the filing date of this application: https://www.sigmaaldrich.com/materials-science/material-science-products.html?TablePage=19353059.

Another suitable additive 104 is a metal-complex dye. Examples of suitable metal-complex dyes include 8-Hydroxyquinoline copper(II), and 8-Hydroxyquinoline zinc. Additional metal-complex dyes are described in the Millipore-Sigma catalog as it existed at the following link as of the filing date of this application: https://www.sigmaaldrich.com/materials-science/material-science-products.html?TablePage=19353127.

Another suitable additive 104 is a protein, and in particular, a photon-responsive protein. These include proteins that are photoactivatable, photo-switchable, or photoconvertible. Examples of suitable proteins include green fluorescent protein, red fluorescent protein, yellow fluorescent protein, MCHERRY, and the many photoactivatable, photo-switchable, photoconvertible and other proteins that are described in a Fluorescent Protein Database as it existed at the following link as of the filing date of this application: https://www.fpbase.org/protein/mcherry/

Another suitable additive 104 is a pigment. Examples of suitable pigments include Phthalocyanine green and Pompeiian Red. Other suitable pigments are those described in the catalog that existed at the following link as of the filing date of this application: https://colourlex.com/pigments/pigments-colour/. Other suitable pigments include cool-roof pigments that scatter strongly in the near infrared while still giving selectable visible colors. Examples of such pigments are described in a database that existed as of the filing date of this application at: https://coolcolors.lbl.gov/LBNL-Pigment-Database/database.html.

Another example of a suitable additive 104 is a particle having dimensions on the order of the radiation with which the material is intended to interact. Such particles can be either microparticles or nanoparticles depending on the relevant wavelength.

Of particular usefulness are metal nanoparticles, and in particular, those made of gold or silver. These particles can take various forms, such as nanospheres, nanorods, and nanoplates. The dimensions of such particles are tuned to interact effectively with the relevant wavelength or to be transparent at visible wavelengths. Such particles can thus be regarded as micro-antennas or nano-antennas.

In some embodiments, the additive 104 comprises metal-hybrid particles, such as silica shells with a metal core, such as a gold core. These are likewise sized to interact with the relevant wavelength of radiation. For a typical application, the wavelengths are such that the particles are nano-particles.

In yet other embodiments, the additive 104 comprises mesoporous nanoparticles. Such nanoparticles are useful because the porosity contributes a high surface-to-volume ratio. It also provides a way to introduce large numbers of small molecules with the particles. In some embodiments, the additive 104 includes mesoporous nanoparticles loaded with fluorescent dye. Suitable mesoporous silica nanoparticles include those made by NANOCOMPOSIX.

Another example of a suitable additive 104 is a magnetic nanoparticle, and in particular, those that have superparamagnetic properties at ambient temperature. A suitable magnetic nanoparticle comprises iron oxide. Such particles are particularly useful because of their ability to be detected through nuclear magnetic resonance.

Another example of a suitable additive 104 is a quantum dot. Quantum dots are semiconductor particles having dimensions on the order of a few nanometers. As such, they are small enough to manifest certain quantum mechanical properties that form the basis for interaction with incident radiation. In a typical case, the quantum dot radiates in response to an excited electron dropping back into a valence band after having been in the conduction band.

Yet another example of a suitable additive 104 is a UV scattering particles. A suitable UV scattering particle, which has relatively low toxicity, is of the type that is secreted from the root of certain ivy plants, notably English ivy.

An additive 104 need not be formed from a single species. In some cases, the additive 104 is a combination of dyes and broadband scattering particles, such as titanium dioxide or zinc oxide. Such scattering particles can be used to tuned to particular colors or wavelengths of incident radiation.

The placement of the additive 104 is application specific. It is possible to disperse the additive 104 within the bulk of the base material 102. However, it is also possible to coat the base material with the additive 104. This is a useful option when working with a powdered base material 102, in which case each particle of base material 102 is coated with a layer of additive 104. It is also useful when working with sheets of materials, as is the case in laminated object manufacturing. In such cases, a layer of additive 104 coats a layer of base material 102.

Figure 2:
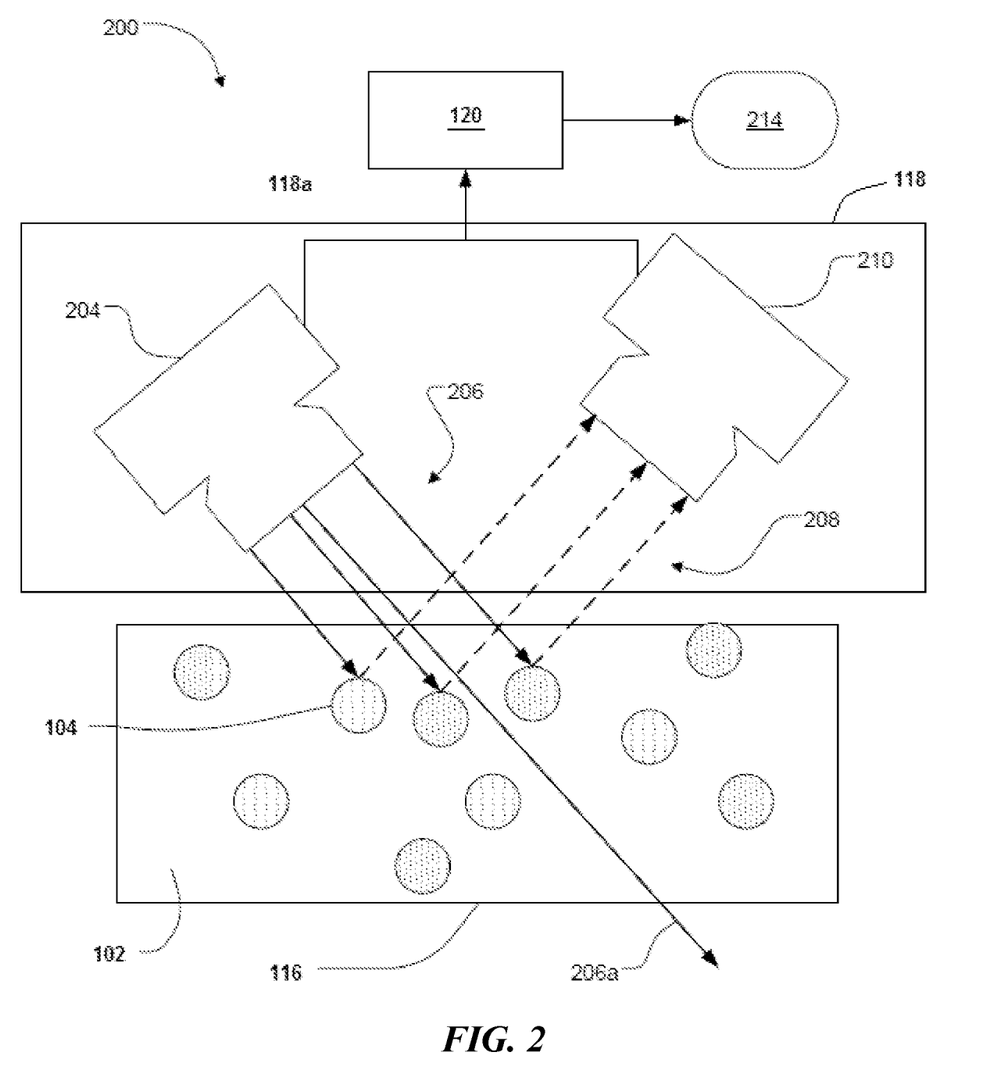
FIG. 2 shows a scanner for use in the apparatus of FIG. 1.

Referring to FIG. 2, a scanner 118 includes a source 204 and a detector 210. The source 204 emits an incident wave 206 towards a partially-fabricated object 116 made of a fabrication material 108a.

As can be seen in FIG. 2, the fabrication material 108a comprises a base material 102 and additive 104 that has been embedded in the bulk of the base material 102. The distribution of the additive 104 is selected to achieve the desired effect. In the illustrated embodiment, the additive 104 is distributed more or less homogenously. Unless otherwise stated, "wave" refers to an electromagnetic wave.

In some embodiments, the source 204 is a broadband source that illuminates the object with white light. In other embodiments, the source 204 is a laser. In yet other embodiments, the source 204 is a projector, such as a liquid-crystal-display projector. Also among other embodiments are those in which the source 204 emits ultraviolet radiation and those in which the source 204 emits infrared radiation. The particular choice of the source 204, including both the wavelength at which it emits radiation, the spatial distribution of that radiation, and its polarization, is based on the interaction that is to be observed.

The set of interactions that are accessible for observation include scattering, reflection, absorption, fluorescence, and radiation as a result of a change in an electric field or magnetic field, such as from movement of a charge carrier or movement of a magnetic dipole associated with a charge carrier. An example of the latter is an observation that results from nuclear magnetic resonance.

In a typical embodiment, the base material 102 is substantially transparent at the wavelength of the incident wave 206.

The incident wave 206 interacts with the fabrication material 108a to yield first and second response waves 208, 206a. As suggested by FIG. 2, the additive 104 forms scattering centers that interact with some of the incident energy. As a result, in this example, the first and second response waves 208, 206a represent scattered radiation and will continue to be referred to as such for convenience. However, in other embodiments, they represent radiation that arises from other interactions, such as fluorescence or chemiluminescence.

The interaction depends on the nature of the fabrication material 108a. In some embodiments, the interaction includes emission rather than scattering. Emission can result from, for example, fluorescence or from realignment of electron spin vectors, such as that which occurs during nuclear magnetic resonance imaging.

The detector 210 receives the scattered wave 208. Examples of a detector 210 include a camera and a photomultiplier. Embodiments include those in which the data received from the detector 210 is collected via a linear readout. The collected data in interpretable using a variety of method, including ratiometric imaging and multispectral imaging.

In certain embodiments, the incident and scattered waves 206, 208 are in the visible range.

The scan data 118a that the process controller 120 receives includes first data, which comes from the source 204, and second data, which comes from the detector 210. Based on this scan data 118a, the process controller 120 provides an object characterization 214 that characterizes the state of the partially-fabricated object 202. Examples of a state include the object's geometry, including that of the object's surface, as well as well as some property of the fabrication material 108a, such as an extent of polymerization.

In the particular scanner 118 shown in FIG. 2, the source 204 illuminates the fabrication material 108a from above. However, in other scanners 118, the source 204 illuminates the fabrication material 108a from below. In such cases, knowledge about the transmissive properties of the fabrication material 108a makes it possible to estimate the material's thickness based on the extent to which it absorbs incident radiation.

The first information characterizes the incident wave 206. In some embodiments, the source 204 scans the incident wave 206 across the object's surface. As such, the source 204 has first information about direction and rate of the scan and the angle of incidence thereof. The source 204 provides this first information to the process controller 120 as part of the scan data 118a.

The second information characterizes the scattered wave 208. In some examples, the detector 210 includes a two-dimensional sensor that corresponds to the detector's field-of-view. In such embodiments, the second information includes information concerning the location within the field-of-view from which the scattered wave 208 originated. The detector 210 provides this second information to the process controller 120 as part of the scan data 118a.

Based on the scan data 118a, the process controller 120 generates an object characterization 214. In some embodiments, the object characterization 214 describes the object's surface or its geometry. In others, it characterizes some physical or chemical property of the fabrication material 108a.

Figure 3:
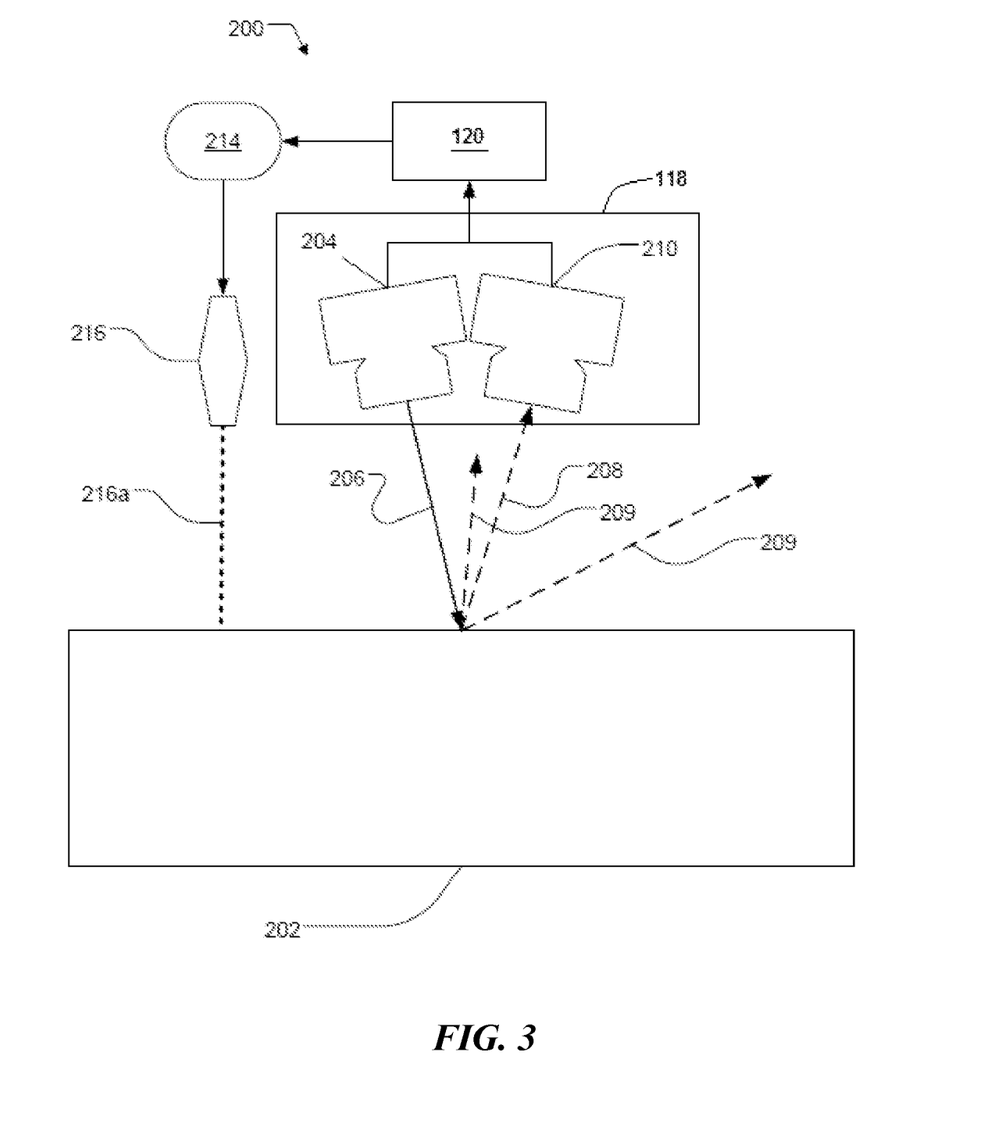
FIG. 3 shows the scanner of FIG. 2 in use with a printer.

FIG. 3 shows the optical scanner 118 in the context of a printing process.

In FIG. 3, the interaction of the incident wave 206 with the fabrication material 108a results in first scattered radiation 208, which scatters from the surface, and second scattered radiation 209, which arises from sub-surface scattering. As shown in FIG. 3, the process controller 120 relies in part on the object characterization 214 as a basis for controlling a printhead 216, and in particular, for adjusting its deposition of fabrication material 108a.

In some embodiments, in response to detecting an incipient manufacturing defect during the fabrication process, the process controller 120 modifies the printhead's operation so that it deposits fabrication material 108a in a way that corrects the defect while it can still be corrected.

Figure 4:
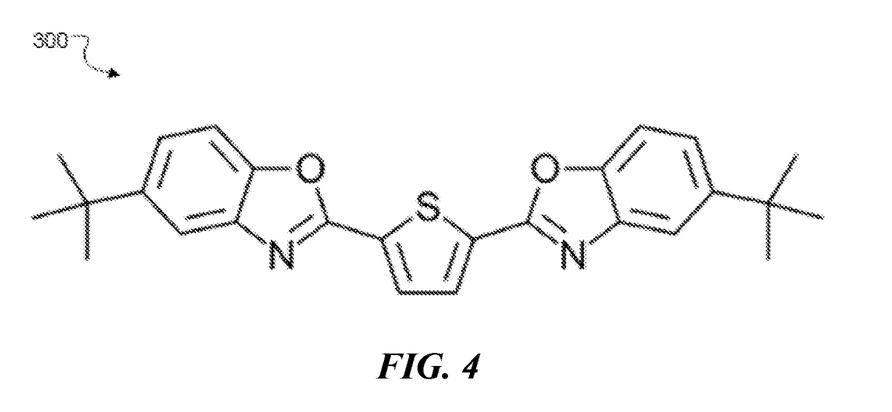
FIG. 4 is a chemical structure of a thiophene additive.
Figure 5:
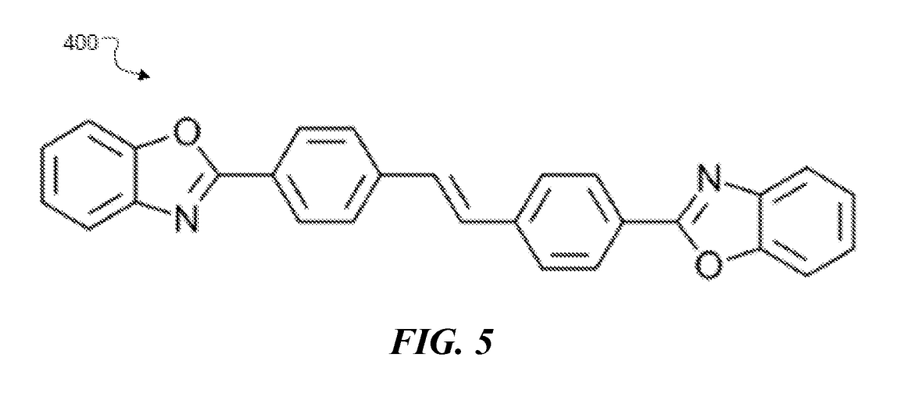
FIG. 5 is a chemical structure of a stilbene additive.

FIGS. 4 and 5 show examples of additives 104 that function as optical brighteners in such industries as textiles, cosmetics, and papermaking to produce brighter whites and to mask yellowing.

Most compounds used for optical brightening are in the stillbene or thiophene class. Examples of common optical brightening compounds are 2,2'-(2,5-thiophenediyl)bis(5-tert-butylbenzoxazole), also known by its trade name OB (300 in FIG. 4), and 2,2'-(1,2-ethenediyl)bis(4,1-phenylene) bisbenzoxazole, also known by its trade name OB-1 (400 in FIG. 5). These materials are typically soluble in UV curable resins at loading fractions of less than 1%.

Optical brighteners are typically fluorophores that absorb ultraviolet and near-UV light and fluoresce blue light. This results in a whitening effect.

Figure 6:
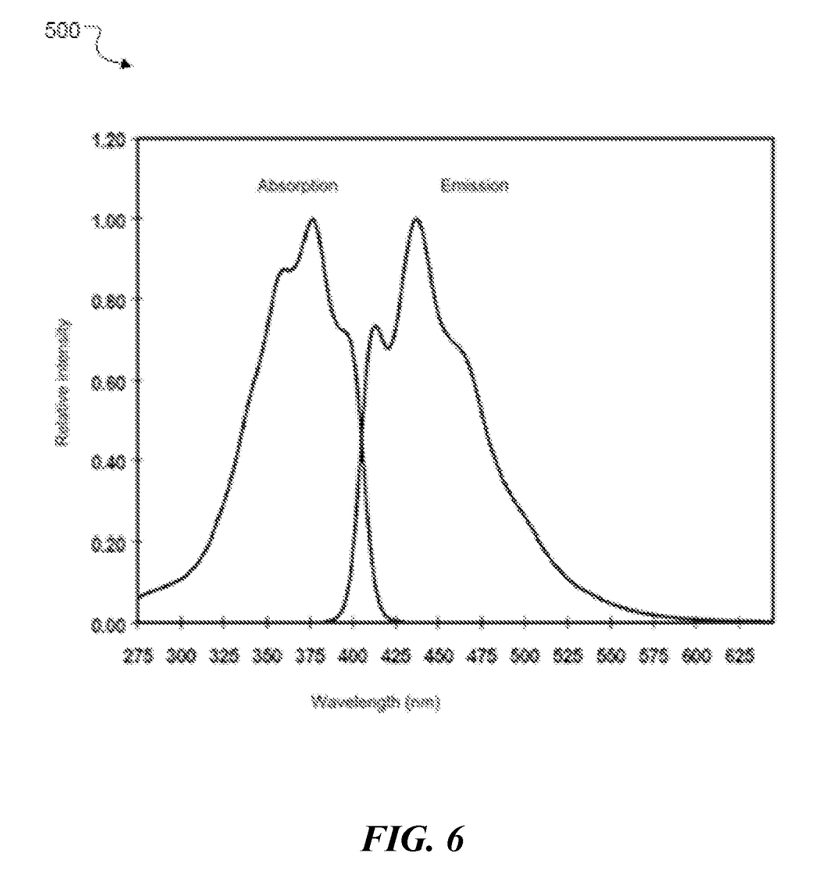
FIG. 6 is a graph of absorption and fluorescence spectra of the stilbene additive shown in FIG. 5.

FIG. 6 shows OB 300 absorbing in the UV range and fluorescing in blue light. The extra blue light tends to flatten the color profile of light from the surface. This reduces the yellow tint that is seen in many polymers.

Once cured, UV curable resins are typically amorphous, transparent materials. As a result, there are certain wavelengths of the incident wave 206 that will penetrate into the bulk material and interact with it. This can be a desirable feature. For example, collecting information from within the bulk material provides a way to infer either geometric properties or physicochemical properties of the bulk material. A suitable additive material 104 when properly distributed provides a way to enhance the collection of such information.

On the other hand, there are applications in which penetration of the incident wave 206 is undesirable. Such penetration and the scattering that results can, in some cases, lead to errors in determining depth. For such applications, it is possible to harness additives 104 to suppress penetration of radiation into the fabrication material 108*a*.

One way to control the extent to which the incident wave 206 penetrates is to vary the loading fraction based on what information is sought. If it is surface geometry that is of most interest, a high loading fraction minimizes the extent to which light penetrates the sample. This means that the detector will receive primarily light that has interacted with the surface.

On the other hand, if information concerning structures within the sample is of interest, a lower loading fraction is useful. This permits extractions of features such as depth.

Among the devices available for determining surface topography is a "profilometer." A typical profilometer relies on laser radiation to inspect a surface. A common wavelength of such laser radiation is at about 405 nanometers.

With this in mind, FIG. 6 shows a particularly useful property of OB-1 400: it has significant absorption and fluorescence at around 405 nanometers, which also happens to be a common wavelength used in laser profilometry. As a result of its absorption, OB-1 400 suppresses the laser radiation's ability to penetrate deep into the sample, thus discouraging scattering from within the bulk material. This is useful for profilometry, in which it is the surface topography that is of most interest.

However, the fluorescence at 405 nanometers also means that OB-1 emits considerable 405-nanometer omnidirectional radiation. As a result, even a modest loading of this brightener all but guarantees that a sufficient intensity of 405-nanometer light reaches the detector. The loading fraction need not be high to achieve this. In some embodiments, the loading fraction is as low as 0.02%.

The foregoing discussion contemplates a single base material 102. However, the foregoing techniques for the addition of an additive 104 and for extracting information about the object 122 based on interactions of radiation with that additive are applicable to the case in which more than one base material 102 is used, either because the object itself comprises more than one base material 102 or because more than one base material 102 is used in the course of fabricating an object 122.

An example of the latter arises when a printhead deposits a support structure around the object 122. In such cases, it is not uncommon for the support structure to be made of a support material differs from the base material 102 from which the object 122 is made.

For accurate fabrication under these circumstances, it is important to control the location at which the support structure and the object 122 meet. One way to promote accuracy is to add additive 104 to the base material 102 but not to the support material, or vice versa. Alternatively, one can use different additives 104 for the base material 102 and the support material. Either method enhances the ability to distinguish between the support material and the base material 102.

In yet another example, detection of the location at which the support structure and the object 122 meet can be accomplished using a combination of pigments (or dyes) and fluorescent additives. For example, the support material can include a first pigment (or dye) with a first color (e.g., spectrum) and the base material used to form the object 122 can include a second pigment (or dye) with a second color (e.g., spectrum). Both the support material and the base material also include a fluorescent additive (or a combination of fluorescent additives) that fluoresces at multiple wavelengths (e.g., a white fluorescent additive or a fluorescent additive that fluoresces at wavelengths corresponding to the first and second colors). To detect a location where the support structure and the object 122 meet, the fluorescent additive is activated (e.g., by illuminating the fluorescent additive with UV light). The light emitted by the fluorescent additive is filtered (e.g., the spectrum of the light emitted from the material is affected by the pigments or dyes) as it passes through the pigments (or dyes) in the support and base materials. A sensor (e.g., a camera) captures the filtered light and processes the captured filtered light to identify a region on the combined object and support material where the color transitions from the first color to the second color. That transition region is identified as a region where the support material and the object 122 meet.

An example of the former case is one in which an object 122 comprises different base materials 102 in different regions thereof. In such cases, it is useful to use different additives 104 in the different base materials 102 to promote different kinds of interaction with incident radiation.

For example, different additives 104 may have different fluorescence wavelengths. In such cases, a change in the wavelength of detected light during scanning implies a transition from a location that comprises a first base material 102 to a location that comprises a second base material 102.

In some cases, the different base materials 102 are not confined to discrete regions. Instead, it is possible for the object 122 to comprise a continuum of different base materials 102 in which the ratios of the base materials 102 differ from one location to another. In such cases, the detected wavelengths from each location and their relative intensities provide a basis for estimating the ratios of different base materials 102 at that location.

The foregoing embodiments provide examples of a more general procedure in which a manufacturing method includes the addition of additives to base materials to promote interaction with incident radiation, a detector for detecting the nature of the interaction, and a data-processing system that uses that information in connection with controlling an additive-manufacturing process. In some cases, the data-processing system includes a machine-vision system and corresponding software. The foregoing detection-enhancement mechanisms are applicable in a variety of contexts. For example, such detection-enhancement can be carried out in connection with scanning in three dimensions. In such cases, electromagnetic radiation is directed towards a material. Interaction of the radiation with the material results in a signal that from which information concerning the three-dimensional structure of the object can be determined. Among these practices are those in which the additive enhances the radiation that results from the interaction, for example by increasing the amplitude of that radiation over what it would have been had no additive been used. The nature of the interaction takes various forms. For example, in some practices, the incident radiation interacts with scattering centers that absorbs and re-emit at the same wavelength and in different directions. This is often referred to as "scattering." It is often the case that such scattering radiation will have scattered multiple times before reaching a detector. This is referred to as "multiple scattering."

In other examples, the result of the interaction is radiation at a longer wavelength. This is typically referred to as "fluorescence." A common example is absorption of ultraviolet and emission of visible light.

Other practices include an interaction that causes emission using an altogether different mechanism. The resulting emission is often referred to as "luminescence." A particularly important interaction is one that triggers a chemical reaction having radiation as a byproduct. This is often referred to as "chemiluminescence."

In other practices, the interaction is confined to the surface of the object. This is often referred to as "specular reflection."

In still other practices, the presence, and in some cases, the concentration, of additive manifests itself by attenuation of an incident wave or alteration of its spectral properties. Based on the resulting radiation, the detector infers the existence and possibly the concentration of additive.

A machine-vision system, including its corresponding software, includes a scanning system that emits electromagnetic radiation and measures radiation that results from interaction of the incident radiation with the material.

The incident radiation is typically chosen to have a relatively short wavelength but not so short as to create additional difficulties. Examples include ultraviolet, visible light, near infrared, and far infrared. In some embodiments, the measurement is carried out directly. In others, it is carried out indirectly.

Among the machine-vision systems that use the foregoing scanning method are those that carry out triangulation scanning, those that carry out profilometry, and those that carry out time-of-flight imaging, either by relying on pulses or phase shifts.

Also among the machine-vision systems that use the foregoing scanning method are those that rely on active stereo methods, those that rely on multi-baseline stereo, those that rely on structured light, and those that rely on focusing and defocusing to actively determine depth.

Some machine-visions systems that rely on the foregoing scanning methods include those that rely on interferometry, those that carry out optical coherence tomography, those that infer shape based on polarization, and those that infer shape from heating.

The nature of the detector used depends in part on the number of additives used. If only one type of additive is used, a monochromatic detector is sufficient. If multiple additives with different spectra are used, a multi-spectral detectors is preferred so as to be able to distinguish the different additives. An example of a multi-spectral detector is a color camera.

In many practices, additives will lie below the scanned object's surface. In the case of translucent materials, this creates a measurement bias. For example, instead of corresponding to the actual surface, the peak value recorded by the detector will correspond to some point below the surface. It is therefore useful to estimate this bias so that it can be compensated for.

A useful method for compensating for the foregoing bias is to have first and second samples. The first sample is one that has been made completely reflective, for example by having been coated with at a thin reflective layer. The second sample has the same topology as the first but is translucent. It has not been coated with a reflective layer.

Once these two samples have been prepared, it is possible to estimate the depth at each location. A comparison of the two measured depths provides a basis for estimating a bias.

Having estimated the bias, it is then possible to optimize the scanning apparatus to reduce bias. This can be done in a variety of ways. For example, it is possible to adjust the relative position of the radiation source relative to the object or the angle of illumination relative to a surface normal vector. In some cases, it is possible to reduce bias by increasing the concentration of additive.

In some cases, the object is made of different materials with different biases. In such cases, the process of bias compensation includes identifying the material being illuminated and using the appropriate bias correction for that material. In some practices, the process of identifying the material includes identifying it based on differences between its spectrum and those of one or more other materials.

Another approach to addressing the problem of having an object be made of different materials is to use additive concentration as a bias-equalizer. This involves adding different concentrations of additive to each material and selecting those concentrations such that each of the different materials, in the end, has the same bias value.

A variety of mechanisms exist for exciting the additive. Embodiments include those in which the source of incident radiation is a laser and those in which it is a liquid-crystal-display projector.

The incident radiation itself is, in some cases, visible light and in other cases, beyond the visible range, either in the ultraviolet or the infrared. In other cases, the incident radiation is well below the visible range, such as in the radio-frequency range.

The various practices also differ in how they cause the excitation to reach the additive. In some embodiments, the radiation enters the material from above. In others, it enters from below.

Still other embodiments the energy input does not arise from electromagnetic radiation. For example, in some embodiments, a chemical reaction caused by combining materials shortly before deposition. These materials are selected to cause luminescence for a limited time. The scanner 118 then uses radiation from this luminescence to determine the object characteristics.

A variety of additives 104 can be used depending on the particular implementation. Examples of additives 104 include small molecules, macromolecules, supramolecular aggregates, proteins, polymers, quantum dots, metal nanoparticles and micro particles, including gold and silver nanoparticles, nanorods or nanoplates, non-metallic nanoparticles and microparticles, such as silica, zeolites, and mesoporous particles, pigments, and dispersions of fine powder.

A particularly useful type of additive 104 is a dye that degrades at a known rate when exposed to ultraviolet This additive 104 is particularly useful because it will generally only be visible when in the most recently-deposited layer. Any dye present in other layers would have been already been exposed to ultraviolet and would therefore tend to have degraded. As a result, the intensity at each point can be used to extract a depth map of the newly-deposited layer.

In other examples, the scanner 118 is used in connection optical coherence tomography. As a result, the scanner 118 ultimately provides depth data in addition to a surface map. For embodiments that carry out optical coherence tomography, it is useful to choose the additive 104 so that it enhances coherent scattering.

In still other examples, the additive 104 is one that is used to determine an extent to which polymerization has occurred. Such an additive 104 makes it possible to determine whether a particular layer has been fully cured or whether it needs additional illumination with ultraviolet curing radiation. Useful additives 104 for such an application include fluorescent dyes that detect the presence of reactive oxygen species for example, unreacted monomers. Also useful for this application are additives 104 that include a dye that response to the presence of particular molecules.

In addition to being used to detect a state of polymerization, an additive 104 can also be used to detect the presence of unwanted byproducts that sometimes form during exposure to ultraviolet.

A variety of physical principles are applicable for extracting information about the object, including such information as surface geometry, depth, degree of polymerization, physical properties, and chemical properties. These include scattering, fluorescence, absorption, fluorescence-lifetime imaging, and confocal imaging.

In some practices, the additive 104 is one that reduces emission rather than promoting it. Such information is useful for the same reason. Ultimately, it is the emission differential that matters and not the sign of that differential.

As a practical matter, it is often useful if the wavelength of the emitted radiation is one that invisible to the human eye and yet visible to the detector. This permits the fully-fabricated object 122 to have the desired color or transparency. For example, gold nanorods scatter only in the infrared and are therefore not visible.

In some practices, the additive 104 is a complex that contains different molecules that cooperate to perform some function. One example of such a complex is a mesoporous silica nanoparticle that has been loaded with fluorescent molecules.

Embodiments of the scanner 118 use different sensors depending on the particular application. In some embodiments, the sensor includes a camera. In others cases, where the emission is not expected to be particularly strong, the sensor includes a photomultiplier.

Embodiments of the process controller 120 carry out data collection and interpretation in a variety of ways, including linear readout, ratiometric imaging, and multispectral imaging.

The scanner 118 and the process controller 120 cooperate to extract different kinds of information from the emitted radiation. Such information is by no means limited to merely determining surface geometric structure of the object. Examples of other information that can be extracted include the structure of the object's body at various locations, for example, near its surface, and material properties of the object, such as the material or combination of materials from which it is made, including the relative amounts of each material, and the degree of curing.

The concentration of additive 104 is of importance in some practices. This is because the amplitude of the emitted wave may depend on that concentration. For example, at a low concentration, due to scattering from a range of depths near the surface of the material, the accuracy of the surface measurement and/or the accuracy of the transition from one base material 102 to either another base material or to a support material may be low. Such accuracy can be improved by using a higher concentration of additive 104. Accordingly, practices of the method include selecting or modifying additive concentration to achieve desired scanning characteristics. Such selection and modification can include specifying spatial distributions of particular additives 104.

Some practices rely on differential scanning to resolve differences between layers of the object as it is being manufactured. This provides a way to filter out the effect of the most recently added layer. Thus, prior to adding layer n+1, a measurement is obtained by causing an interaction between an incident wave and all preceding layers 1 . . . n. This measurement, when subtracted from a measurement taken after having added layer n+1, provides a way to isolate the effect of layer n+1.

Practices of the foregoing method also include adding the additive 104 at different points in the process.

For example, in some cases, the additive 104 is added well before use. Thus, the base material 102, after having been enhanced with the additive 104, can be sold in this enhanced form and used some time later. In such cases, the material combiner 108 and proportion controller 110 in FIG. 1 would not be necessary.

A disadvantage of the foregoing method of adding the additive 104 in advance is that it is not possible to spatially vary the additive concentration during the additive-manufacturing process 100. To ameliorate this difficulty, it is possible to provide the additive 104 separately and add it to the base material 102 on demand as shown in FIG. 1.

In some embodiments, the process controller 120 controls the proportion controller 110 based on a feedback signal. This permits feedback control over the composition of the fabrication material 108a based on energy received from the additive 104 during printing. Thus, if the process controller 120 finds that emission is too weak to carry out meaningful measurements, it causes the proportion controller 110 to increase additive concentration in subsequent layers of the partially-fabricated object 116.

Embodiments include those in which the process controller 120 is implemented in a non-abstract form as executable instructions stored on a non-transitory machine-readable medium. The medium comprises matter, preferably baryonic matter. These instructions, when executed by a processor cause the process controller 120 to perform the steps of procedures described above. In doing so, the process controller 120 consumes energy and generates waste heat, which is a property shared by non-abstract devices. In some embodiments, the process controller 120 is implemented in hardware, for example, using application-specific integrated circuits or field programmable gate arrays.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for additive manufacturing including:
   forming an object including depositing a first material including a first coloring component and a second material including a second coloring component, wherein both the first material and the second material further include a corresponding fluorescent component;
   scanning the object, including
      causing an emission of an optical signal from the object, wherein the emission of the optical signal is caused at least in part by an emission from the fluorescent components interacting with the first coloring component and the second coloring component as it passes from the fluorescent components to the surface of the object;

sensing the emission of the optical signal;

determining presence of the first material and the second material based at least in part on the sensed emission of the optical signal, and controlling further depositing of the material on the object according to the determined presence of the first material and the second material.

2. The method of claim 1 wherein the interaction of the emission from the fluorescent components with the first coloring component and the second coloring component includes at least some of the emission reflecting off the coloring components.

3. The method of claim 1 wherein the first material and the second material include the same fluorescent component.

4. The method of claim 3 wherein the fluorescent component emits light with a spectrum including a first wavelength corresponding to a first color of the first coloring component and a second wavelength corresponding to a second color of the second coloring component.

5. The method of claim 1 wherein the corresponding fluorescent component of the first material emits light with a wavelength corresponding to a first color of the first coloring component and the corresponding fluorescent component of the second material emits light with a wavelength corresponding to a second color of the second coloring component.

6. The method of claim 1 wherein the first coloring component and the second coloring component are dyes or pigments.

7. The method of claim 6 wherein the first coloring component and the second coloring component are dyes.

8. The method of claim 6 wherein the first coloring component and the second coloring component are pigments.

9. The method of claim 1 further comprising identifying a region of transition from the first material to the second material based at least in part on the determined presence of the first material and the second material.

10. The method of claim 9 further comprising controlling further depositing of the material on the object according to the identified region of transition.

11. The method of claim 1 wherein determining the presence of the first material and the second material includes distinguishing the materials according to spectral characteristics of the optical signal emitted from the object.

12. The method of claim 1 wherein causing the emission of the optical signal from the object includes illuminating the object with electromagnetic radiation.

13. The method of claim 12 wherein the electromagnetic radiation includes radiation in one or more of an ultraviolet spectrum, a visible spectrum, and an infrared spectrum.

14. The method of claim 1 wherein the first material and the second material are substantially transparent.

15. The method of claim 1 wherein the first material and the second material are translucent.

16. The method of claim 1 wherein sensing the emission of the optical signal includes sensing the emission using a camera.

17. The method of claim 1 wherein the first material comprises a build material and the second material comprises a support material.

18. The method of of claim 17, wherein the build material comprises an ultra-violet or visible light curable resin and the support material comprises a wax.

19. The method of claim 1 wherein scanning the object includes using a laser profilometry technique.

* * * * *